United States Patent Office 3,328,131
Patented June 27, 1967

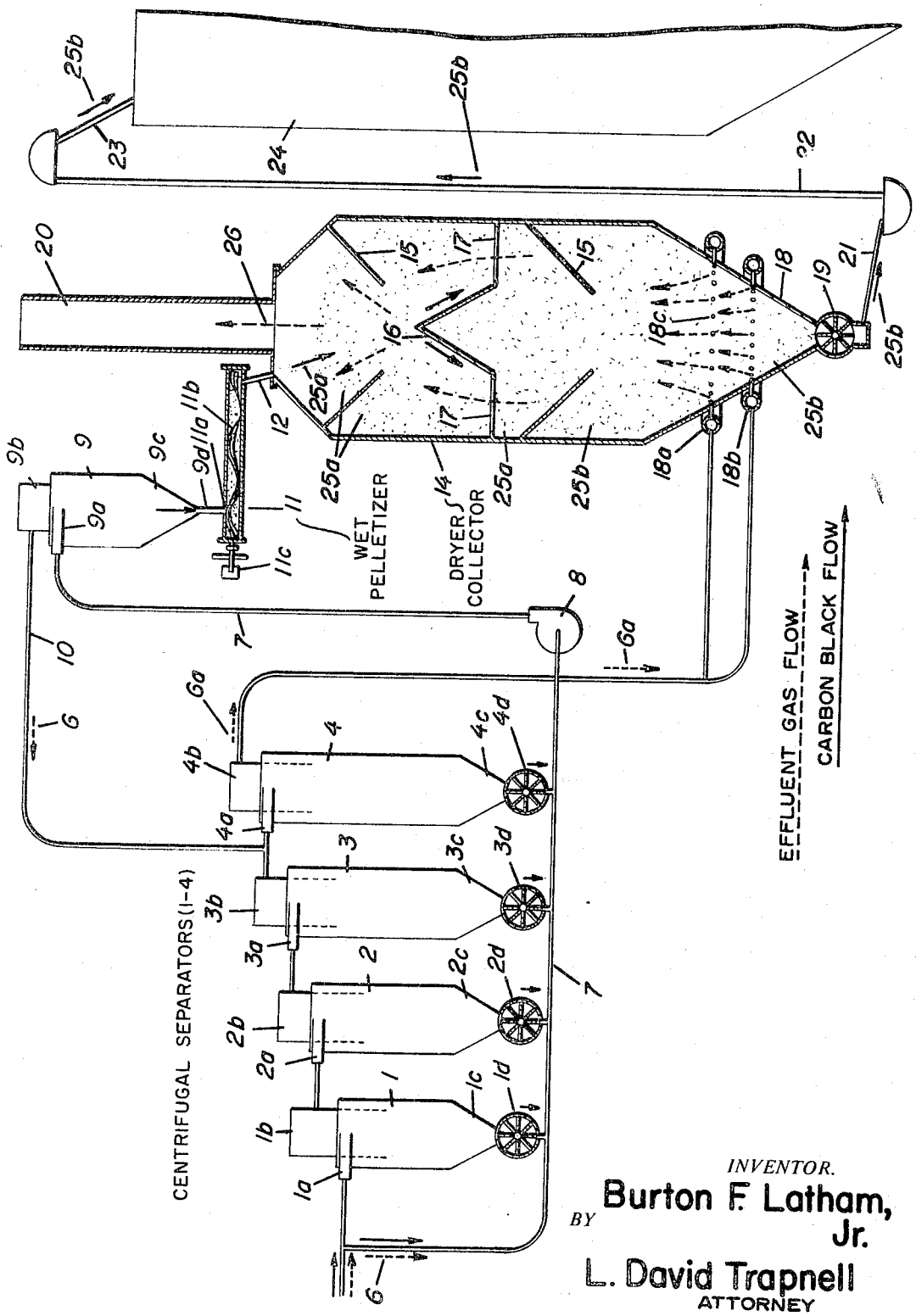

3,328,131
PROCESS AND APPARATUS FOR CONTACTING CARBON BLACK PELLETS WITH BAG FILTER EFFLUX
Burton F. Latham, Jr., Houston, Tex., assignor to Continental Carbon Company, Houston, Tex., a corporation of Delaware
Filed Nov. 10, 1964, Ser. No. 410,057
4 Claims. (Cl. 23—314)

This invention relates to the making of carbon black pellets, and more particularly to a process and apparatus therefor wherein the recovery of carbon black from a furnace effluent and the wet pelletization thereof is an integrated operation which obviates the need for both a secondary recovery system and a pellet drier. More particularly, there is involved the combination of a new process of secondary carbon black collection and a new process of drying the wet pelletized carbon black product.

In the present art of manufacturing carbon black, it is well known that the preferred way of separating the suspended carbon black from its effluent gas stream is by utilizing a glass cloth bag filter, which can be preceded by primary cyclone collectors. Such a glass cloth bag filter combines high collection efficiency, dry carbon black collection and eliminates corrosion difficulties which are experienced with secondary wet collectors. However, it is the most costly piece of equipment used in a modern carbon black manufacturing plant, since the average life of the glass cloth filter bags within the bag filter is, at the present time, approximately one year, thus making replacement costs very high.

It is equally well known in the art of manufacturing carbon black that the preferred way of pelletizing the loose carbon black is the wet pelletizing process. This method or process is more popular than the older drum-dry pelletizing method because it produces a more uniform, harder, dust-free pellet that can be shipped in bulk form (via hopper car, hopper trucks, tote bins, etc.) with less breakdown of the pellets; and that unloads from the bulk containers with greater ease and speed. In this wet pelletizing process water is mixed with the fluffy carbon black by a high speed pin-type agitator to produce wet pellets averaging approximately 1/16-inch in diameter. The resulting wet pelletized product contains from about 30% to about 50% water (varying with the grade of the carbon black) and is usually dried in an elongate stainless steel drying drum. These drying drums are the second most costly item in a modern carbon black plant. Also, the drum-drying operation is the most difficult step to control in the processing of the carbon black and over-oxidation of the carbon black often occurs.

According to the teachings of the present invention the hot effluent of a carbon black reactor is subjected to separation into gas and carbon black with the carbon black being pelletized by a process comprising the steps of: separating a substantial portion of the carbon black from the effluent by primary dry cyclone means; wet pelletizing the carbon black and passing the same to the upper portion of a collector-dryer means forming a bed of carbon black therein; passing the gaseous effluent from the cyclone means to the lower portion of a collector-dryer means; passing the wet pelletized carbon black and the hot gaseous effluent containing some flocculent carbon black counter-currently through the collector-dryer means whereby the carbon black is dried to a pelleted carbon black and the effluent deposits the entrained carbon black on said black upon contacting and drying said black. Because of the depth of the wet bed and the low gas velocity used that does not turbulently mix the wet and dried pellets (as would occur in a high velocity fluid bed) attrition of these pellets and resuspension of carbon black fines in the effluent gas stream does not occur. This results in very high efficiency in the collection of the carbon black. The hot effluent gas (usually between 400° F. to 800° F.) carries the suspended carbon black remaining after primary collection into the wet bed and dries the wet pellets; and the remaining suspended carbon black is collected on the surface of the wet pellets. Thus, the secondary collection of the carbon black and the drying of the wet pellets are combined into one efficient operation and eliminates the use of the expensive glass bag filter and the expensive drying drum.

The foregoing and other objects and advantages of the present invention will become more evident from the following description and the accompanying drawing in which the single figure is a schematic view, partly in section.

Referring more particularly to the drawing, the arrows at the left hand extremity of the apparatus indicate flow from a carbon black reactor of effluent gas bearing the carbon black. The carbon black reactor as such forms no part of the present invention, and accordingly, is neither shown in the drawings nor specifically referred to hereinafter.

Disposed adjacent the aforementioned outlet of the carbon black reactor is a series of successive and vertically disposed cyclone separators 1, 2, 3 and 4 each of which is provided with a tangential inlet, as indicated at 1a, 2a, 3a and 4a, respectively; the said tangential inlets being connected in series as indicated by the arrows.

The upper portion of each of the cyclone separators 1, 2, 3 and 4 is provided with a concentric outlet tube as shown at 1b, 2b, 3b and 4b; and the bottoms of said cyclone separators define frusto-cones 1c, 2c, 3c and 4c the lower ends of which communicate with rotary airlocks 1d, 2d, 3d and 4d, respectively.

A line 6 is connected to the tangential inlet 1a of the first, or primary, cyclone and communicates with one end of a pneumatic conveyor 7 which is disposed slightly beneath the rotary airlocks 1d, 2d, 3d and 4d. Thus, a small fraction or the total effluent gas is pulled as conveyor gas from the tangential inlet 1a for motivating the pneumatic conveyor 7.

The pneumatic conveyor 7 contains a conveyor fan 8 and communicates with a conveyor cyclone 9.

The upper end of this conveyor cyclone 9 is provided with a tangential inlet 9a and a concentric outlet tube 9b, the latter being connected by a line 10 with the tangential inlet 4a of the cyclone separator 4.

The lower end of the conveyor cyclone 9 comprises a frusto-cone 9c provided with a carbon black discharge orifice 9d from which the carbon black drops by gravity into the inlet opening of a wet pelleting box 11. The interior of the wet pelleting box is supplied with water, as at 11a and also with box 11 is a suitable means 11c for driving a rotary agitator 11b, which may be of conventional design.

The wet pellets formed in the wet pelleting box 11 flow therefrom through a discharge orifice 12 into a wet pellet carbon black collector-dryer 14 which contains an upper baffle 15 of inverted frusto-conical shape; and a centrally disposed conical baffle 16 carried by inwardly extending baffle supports 17.

The lower end 18 of the collector-dryer 14 is of inverted frusto-conical shape and disposed on the exterior thereof is a pair of upper and lower horizontally disposed circular manifolds 18a and 18b, respectively.

The exhaust ports of these circular manifolds 18a and 18b communicate with the apertures 18c in the sidewall of the lower end 18 of the collector-dryer 14 and feed effluent gas thereinto as supplied through a line 6a which communicates with the concentric outlet 4b of the cyclone separator 4.

The lower end 18 of the collector-dryer 14 is of inverted frusto-conical shape and provided at its bottom with a rotary airlock 19, the latter communicating with a gravity chute 21.

The lower end of the gravity chute 21 connects with the lower end of a bucket elevator 22 which raises material therein to a gravity chute 23, the lower end of which communicates with a storage tank 24.

In the drawing the wet pellets and dry pellets are indicated at 25a and 25b, respectively, and 26 indicates the effluent gas which passes from the gas discharge ports of the superposed circular manifolds 18a and 18b and through the apertures 18c in the inverted frusto-conical lower end of the collector-dryer 14 for discharge through stack 20 in a substantially carbon free condition.

OPERATION

As previously stated, the carbon black bearing effluent gas coming from the carbon black reactor enters the tangential inlet 1a of cyclone 1 and part of the suspended carbon black is agglomerated and separated by centrifugal and gravitational force, leaving the cyclone 1 through its inverted frusto-conical lower portion 1c and rotary airlock 1d, and dropping into the pneumatic conveyor 7. The effluent gas with a portion of the carbon black suspended therein passes upwardly through concentric outlet tube 1b, through tangential inlet 2a, and thence through cyclone separator 2. In similar manner the effluent gas and suspended carbon black passes into the remaining series of cyclones 2, 3 and 4. From 50 to 90% of the total suspended carbon black is separated in the series of four cyclones and is discharged into pneumatic conveyor 7. The small fraction of the total effluent gas, which is pulled through line 6 as conveyor gas ahead of the tangential inlet 1a of the primary cyclone, passes under the four rotary airlocks 1d, 2d, 3d and 4d of the four cyclones conveying the primary collected black through pneumatic conveyor 7 including conveyor fan 8 into conveyor cyclone 9 where most of the carbon black is separated from the pneumatic conveyor gas. As previously mentioned this conveyor gas passes through concentric outlet tube 9b and is returned through line 10 to the tangential inlet 4a of cyclone 4.

The loose, unpelletized carbon black leaves conveyor cyclone 9 through the cone 9c and carbon black discharge 9d, dropping into the wet pelletizing box 11. The pelletizing water 11a is added and mixed with the loose carbon black, the agitator 11b forming wet pellets 25a that are discharged through the mixing box discharge 12 into the wet pellet carbon black collector-dryer 14. The wet pellets 25a form a bed supported by dry pellets 25b that gradually settle. The top level of this bed remains at practically a constant through the use of a differential pressure controller (not shown), which measures the pressure drop across the bed and controls the rotational speed of rotary airlock 19 so that the dried pellets 25b are being discharged at the same carbon rate as the wet pellet addition.

The hot effluent gas 26 passes from line 6a through the exhaust ports of the circular manifolds 18a and 18b, entering the cone 18 of the dryer-collector 14 through the apertures 18c.

The hot effluent gas 26 first passes up through the lower bed of dried pellets 25b, and then meets the outer lower baffle 15 which deflects this gas toward the center where it meets the slowly settling bed of wet pellets. The hot effluent gas continues to rise through the pellet bed, evaporating water therefrom; and the suspended carbon particles in this gas impinge on the surfaces of the wet pellets and adhere thereto.

The hot effluent gas next contacts the baffle supports 17 and conical baffle 16 and is deflected outwardly to the wall of 14. As the effluent gas 26 continues up through the wet pellets, it is cooled by the continuous water evaporation of the water from the wet pellets; and it is again deflected to the center of the wet pellet bed by the upper baffle 15. Thus, the rising hot effluent gas is forced by the baffles to pursue a zig-zag path from the inside of the pellet bed to the outside and vice versa; meeting the slowly settling bed of pellets in both directions. The baffles prevent channeling of the descending pellet bed or a channeling of the rising effluent gas 26; and cause all the wet pellets to be thoroughly contacted by hot effluent gas. The baffles also help support the pellet bed and help prevent packing of the pellets. The rolling and sliding section of the pellets across the baffles and the bottom discharge cone 18 helps compact the loose black collected from the effluent gas stream on the surface of the wet pellets.

The wet effluent gas 26 is discharged through stack 20; and the dried pellets 25b are fed from the cone 18 of the dryer-collector at a controlled rate via the rotary airlock 19, dropping through gravity chute 21 into bucket elevator 22, then being lifted into gravity chute 23 and dropped into the storage tank 24.

It should be noted that all the drying is accomplished by an oxygen-free effluent gas, thus, eliminating any danger of oxidation of the surface of the carbon black particles.

From the foregoing it will be perceived that the process of the present invention includes gravitationally and centrifugally separating carbon black from a furnace effluent, wet pelletizing the separated carbon black and contacting a slowly descending bed of the wet pellets with the lead efflux from the gravitational separator(s) in a countercurrent flow; whereby the entrained carbon black of said efflux adheres to the wet pellets and, at the same time, the sensible heat of the efflux serves to effect drying of the pellets.

The invention having thus been described, what is claimed and desired to be secured by Letters Patent is:

1. The method of pelletizing carbon black which includes gravitationally and centrifugally separating carbon black from a furnace effluent, wet pelletizing the separated black; conveying the wet pellets to a dryer collector; gravitationally moving the pellets through said collector; counter-currently passing heated gaseous efflux from the centrifugal separation through said collector and pellets adhering the carbon black of said efflux to the wet pellets and drying the pellets.

2. A process for pelletizing carbon black which includes passing a stream of hot gaseous effluent from a carbon black furnace through a gas-solids separator; wet pelletizing the solids from the gas-solids separator; conveying the wet pellets to a dryer collector; gravitationally moving the wet pellets through a collector wherein a bed of pellets descends slowly therethrough; contacting the slowly descending bed of pellets with a countercurrent stream of heated gaseous efflux from the gas-solids separator adhering the entrained carbon black of the efflux to the wet pellets and drying the pellets; and removing the dried, pelletized black from said dryer collector.

3. Apparatus for pelletizing carbon black comprising, in combination, a gas-solids separator for receiving the hot gaseous effluent from a carbon black furnace; a wet pelletizer; means for conveying the solids from said gas-solids separator to said wet pelletizer; a dryer collector having horizontally disposed baffles of inverted frusto-conical shape and a centrally disposed conical baffle intermediate the said inverted baffles and supported by inwardly extending baffle supports; means for conveying wet pellets from said wet pelletizer to said collector; and means for transmitting the gaseous efflux from said gas-solids separator to the lower portion of the interior of said collector, whereby the entrained carbon black of said efflux adheres to the wet pellets and at the same time the sensible heat of said efflux serves to dry the pellets.

4. Apparatus for pelletizing carbon black comprising, in combination, a gas-solids separator for receiving the hot gaseous effluent from a carbon black furnace; a wet pelletizer; means for conveying the solids from said gas-solids separator to said wet pelletizer; a dryer collector having horizontally disposed baffles of inverted frusto-conical shape and a centrally disposed conical baffle intermediate the said inverted baffles and supported by inwardly extending baffle supports; means for conveying wet pellets from said wet pelletizer to said collector; at least one circular manifold encompassing said collector adjacent the lower end thereof; said circular manifold having ports which communicate with the interior of said collector; and means for transmitting the gaseous efflux from said gas-solids separator to said circular manifold, whereby the entrained carbon black of said efflux adheres to the wet pellets and at the same time the sensible heat of said efflux serves to dry the pellets.

References Cited
UNITED STATES PATENTS

| | | | |
|---|---|---|---|
| 2,949,349 | 8/1960 | King | 23—314 |
| 3,024,093 | 3/1962 | Dye | 23—314 |
| 3,050,378 | 8/1962 | Kron | 23—314 |
| 3,092,471 | 6/1963 | Stromeyer | 34—171 |
| 3,116,119 | 12/1963 | Osburn | 23—314 |

NORMAN YUDKOFF, *Primary Examiner.*

G. HINES, *Assistant Examiner.*